(12) United States Patent
Khouri

(10) Patent No.: US 7,802,914 B2
(45) Date of Patent: Sep. 28, 2010

(54) MIXING DRUM BLADE SUPPORT

(75) Inventor: Anthony J. Khouri, 39 Shoalhaven Road, Sylvania Waters, Sydney NSW 2224 (AU)

(73) Assignees: McNeihus Truck and Manufacturing, Inc., Dodge Center, MN (US); Favco Composite Technology (US), Inc., Sydney, New South Wales (AU); Favco Truck Mixers International Pty Limited, Sydney, New South Wales (AU); Composite Technology R&D Pty Limited, Sydney, New South Wales (AU); Anthony J. Khouri, Sydney, New South Wales (AU); William Rodgers, Sydney, New South Wales (AU)

( * ) Notice: Subject to any disclaimer, the term of this patent is extended or adjusted under 35 U.S.C. 154(b) by 1051 days.

(21) Appl. No.: 10/568,304

(22) PCT Filed: Aug. 15, 2003

(86) PCT No.: PCT/US03/25657
§ 371 (c)(1),
(2), (4) Date: Sep. 5, 2006

(87) PCT Pub. No.: WO2005/018894
PCT Pub. Date: Mar. 3, 2005

(65) Prior Publication Data
US 2007/0189110 A1   Aug. 16, 2007

(51) Int. Cl.
*B28C 5/42* (2006.01)

(52) U.S. Cl. ................................................ 366/59

(58) Field of Classification Search ............... 366/53, 366/54, 56, 57, 58
See application file for complete search history.

(56) References Cited

U.S. PATENT DOCUMENTS

| | | | |
|---|---|---|---|
| 1,501,566 A | | 7/1924 | Lundberg |
| 1,781,965 A | * | 11/1930 | Ball .............................. 366/44 |
| 1,983,891 A | * | 12/1934 | Ball .............................. 366/40 |
| 2,303,902 A | * | 12/1942 | Ball ............................... 366/2 |
| 2,511,240 A | | 6/1950 | Bohmer et al. |
| 2,696,372 A | | 12/1954 | Gerst |

(Continued)

FOREIGN PATENT DOCUMENTS

DE        956378        1/1957

(Continued)

OTHER PUBLICATIONS

Supplementary European Search Report for PCT/AU0300664, date of mailing Jan. 8, 2008, 2 pages.

(Continued)

*Primary Examiner*—Tony G Soohoo
(74) *Attorney, Agent, or Firm*—Foley & Lardner LLP

(57) ABSTRACT

A heavy duty rotary concrete mixing drum (16) for coupling to a vehicle (10) having a powered drivetrain (18) for rotating the drum comprises a wall and at least one projection (32). The wall (33) includes an inner surface (34) defining a volume and an outer surface (36). The at least one projection is coupled to the wall and extends from the inner surface of the wall. The projection includes a body and a support member (48) disposed within the body.

35 Claims, 8 Drawing Sheets

U.S. PATENT DOCUMENTS

| | | | |
|---|---|---|---|
| 3,080,152 A * | 3/1963 | Lendved | 366/44 |
| 3,144,242 A | 8/1964 | Retzlaff | |
| 3,592,448 A | 7/1971 | Stevenson | |
| 3,700,512 A | 10/1972 | Pearson et al. | |
| 3,717,328 A | 2/1973 | Stevenson | |
| 3,795,121 A | 3/1974 | Cressman | |
| 3,929,321 A | 12/1975 | Sims | |
| 4,064,956 A | 12/1977 | Wildey | |
| 4,086,378 A | 4/1978 | Kam et al. | |
| 4,124,304 A * | 11/1978 | Suganuma | 366/60 |
| 4,223,997 A | 9/1980 | Violet et al. | |
| 4,363,687 A | 12/1982 | Anderson | |
| 4,435,082 A | 3/1984 | Bishop | |
| 4,491,415 A | 1/1985 | Bishop | |
| 4,521,116 A | 6/1985 | Adsit | |
| 4,525,228 A | 6/1985 | Bowen | |
| 4,569,648 A | 2/1986 | Riederer et al. | |
| 4,585,356 A | 4/1986 | Hudelmaier | |
| 4,634,284 A | 1/1987 | Bishop | |
| 4,655,602 A | 4/1987 | Tomlinson | |
| 4,730,934 A | 3/1988 | Schwing | |
| 4,750,840 A | 6/1988 | Bishop | |
| 4,756,623 A | 7/1988 | Bishop | |
| 4,822,272 A | 4/1989 | Yanase et al. | |
| 4,877,327 A | 10/1989 | Whiteman, Jr. | |
| 4,937,010 A | 6/1990 | Maillat | |
| 5,056,924 A | 10/1991 | Christenson | |
| 5,118,198 A | 6/1992 | Whiteman, Jr. | |
| 5,178,457 A | 1/1993 | Helmy | |
| RE34,505 E | 1/1994 | Whiteman, Jr. | |
| 5,302,017 A | 4/1994 | Platek et al. | |
| 5,348,387 A * | 9/1994 | Gordon et al. | 366/63 |
| 5,378,061 A | 1/1995 | Christenson | |
| 5,399,192 A | 3/1995 | Yamasoe | |
| 5,427,449 A | 6/1995 | Christenson et al. | |
| 5,432,211 A | 7/1995 | Morita et al. | |
| 5,441,341 A | 8/1995 | Halsted | |
| 5,460,675 A | 10/1995 | Moser | |
| 5,487,604 A | 1/1996 | Moran | |
| 5,492,401 A | 2/1996 | Halsted | |
| 5,772,938 A | 6/1998 | Sharp | |
| 5,816,702 A | 10/1998 | Mays et al. | |
| 5,839,924 A | 11/1998 | Ritson | |
| H1872 H | 10/2000 | Bowman | |
| 6,902,311 B1 * | 6/2005 | Khouri et al. | 366/54 |

FOREIGN PATENT DOCUMENTS

| | | |
|---|---|---|
| DE | 40 10 539 A1 | 10/1991 |
| EP | 0 998 383 B1 | 5/2000 |
| GB | 2 032 793 A | 5/1980 |
| GB | 2 274 404 A | 7/1994 |
| JP | 53-88261 | 8/1978 |
| RU | 1796533 A1 | 2/1993 |
| RU | 2 052 350 C1 | 1/1996 |
| SU | 421520 | 3/1974 |
| SU | 977188 | 11/1982 |
| WO | WO 97/32702 A1 | 9/1997 |
| WO | WO 00/64651 | 11/2000 |
| WO | WO 01/26871 A1 | 4/2001 |
| WO | WO 03/101694 A1 | 12/2003 |
| WO | WO 2005/018897 A1 | 3/2005 |
| WO | WO 2005/018898 A1 | 3/2005 |
| WO | WO 2005/018899 A1 | 3/2005 |
| WO | WO 2005/025438 A1 | 3/2005 |
| WO | WO 2005/025657 A1 | 3/2005 |
| WO | WO 2005/095073 A1 | 10/2005 |

OTHER PUBLICATIONS

PCT International Search Report, based on International Application No. PCT/AU00/01226, Date of mailing of the International Search Report Dec. 6, 2000 (2 pgs.).

* cited by examiner

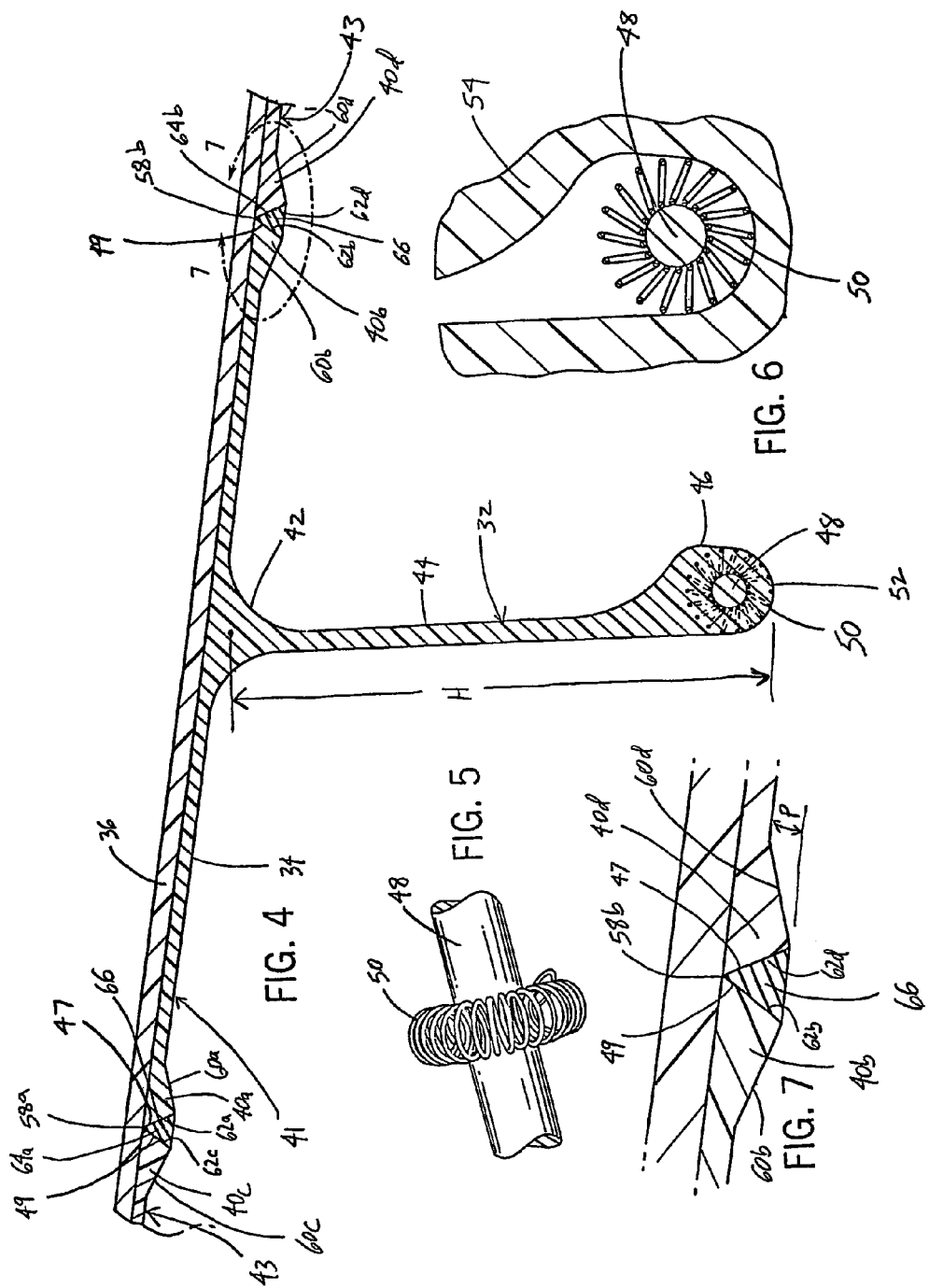

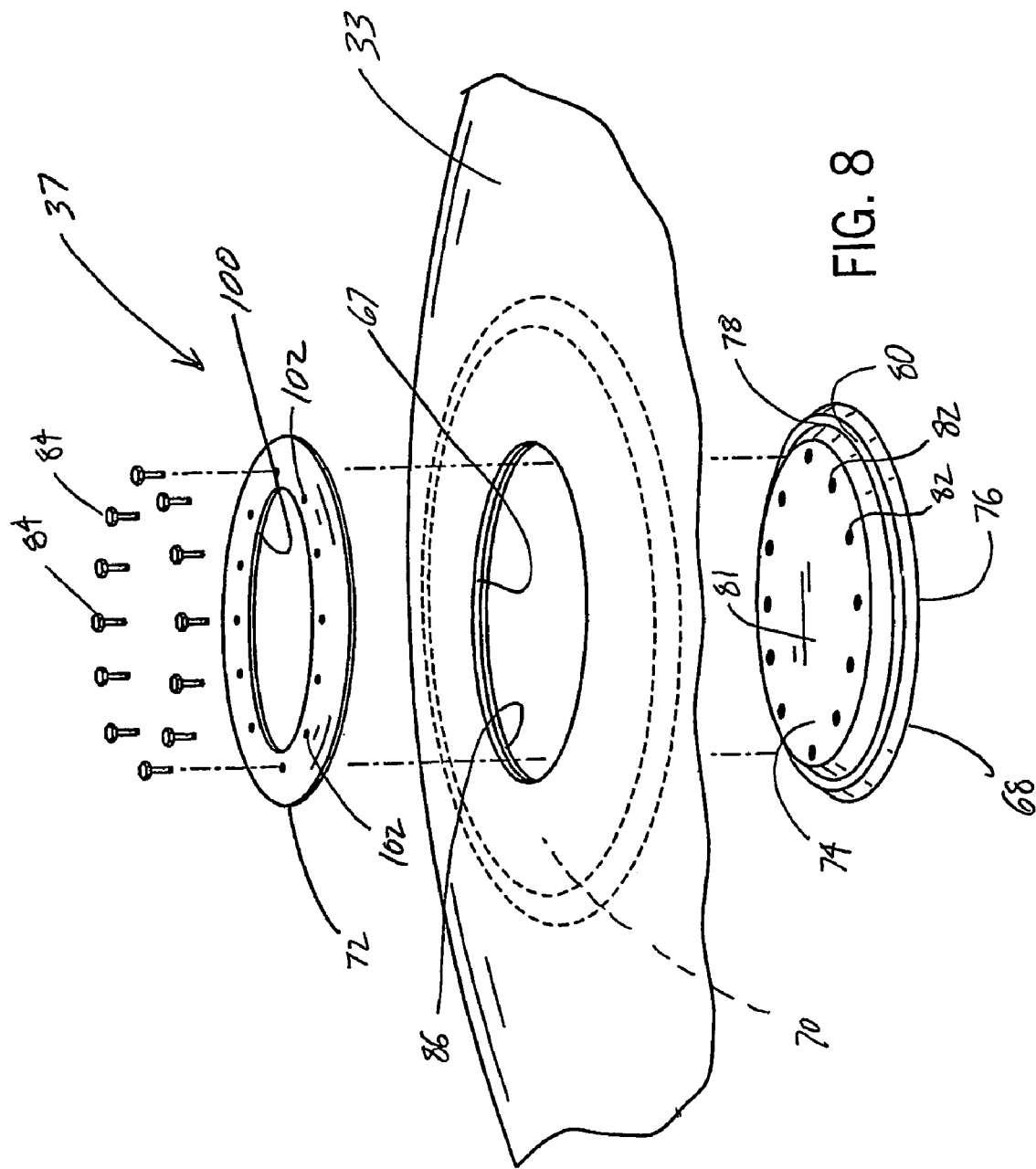

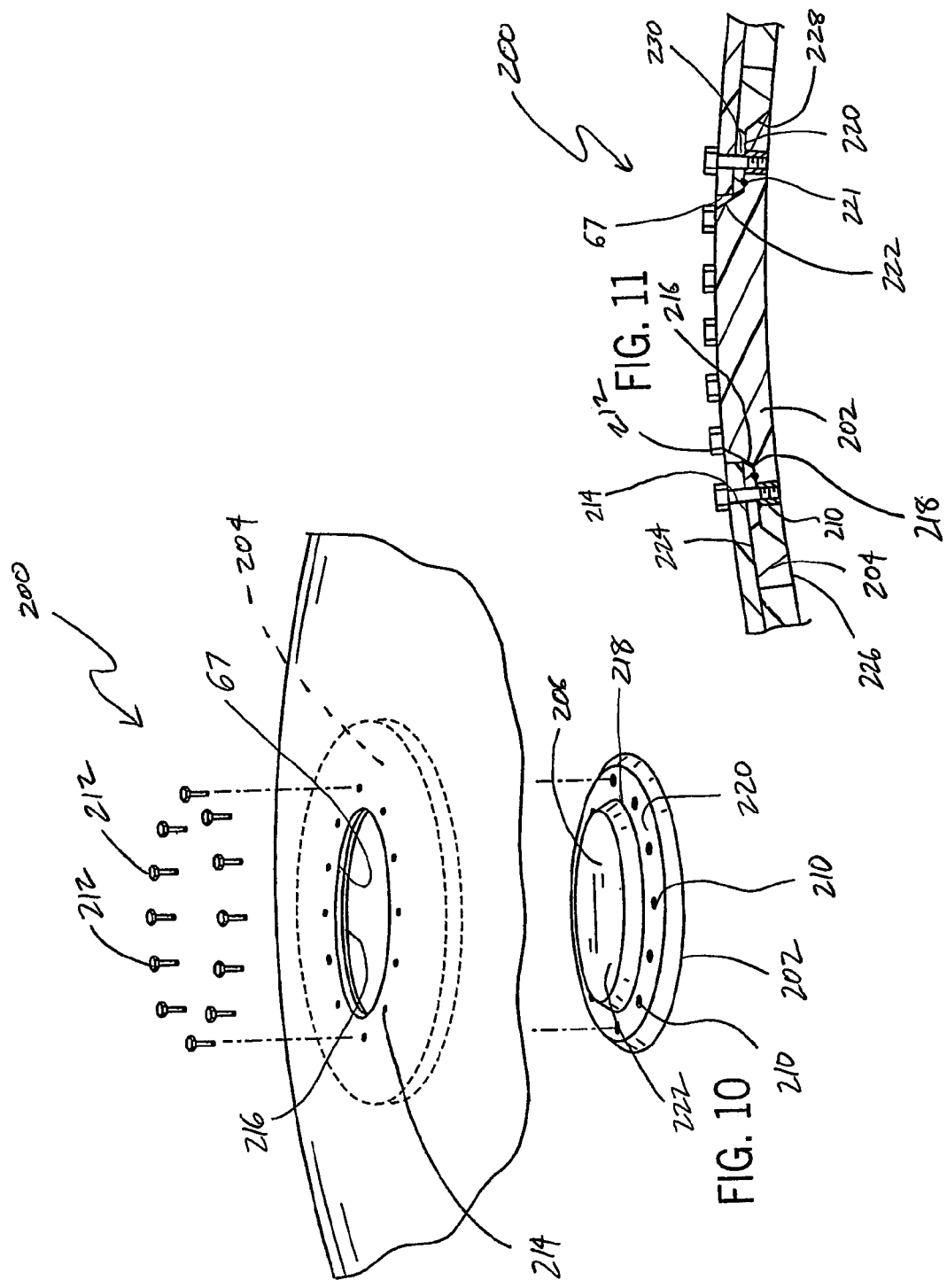

MIXING DRUM BLADE SUPPORT

CROSS-REFERENCE TO RELATED PATENT APPLICATIONS

The present application is related to co-pending International PCT Patent applications entitled MIXING DRUM BLADE by Anthony Khouri and William Rodgers, MIXING DRUM by Anthony Khouri and Peter Saad, MIXING DRUM HATCH by Anthony Khouri, William Rodgers, and Peter Saad, and MIXING DRUM DRIVE RING by Vadim Pihkovich filed concurrently herewith, the full disclosures of which are hereby incorporated by reference.

The present application is also related to International Patent Application Ser. No. PCT/AU00/01226 filed on Oct. 9, 2000 by William Rogers entitled VEHICLE MOUNTED PLASTICS DRUM FOR CONCRETE MIXING AND METHODS OF MANUFACTURE THEREOF, and International Patent Application Ser. No. PCT/AU03/00664 filed on May 31, 2003 by Anthony Khouri entitled VEHICLE MOUNTED CONCRETE MIXING DRUM AND METHOD OF MANUFACTURE THEREOF, the full disclosure of which are hereby incorporated by reference.

BACKGROUND OF THE INVENTION

The present invention relates generally to the field of composite, heavy-duty, rotary, concrete mixing drums capable of attachment to vehicles and components for use with such drums.

Existing concrete mixing trucks or vehicles that are used to transport concrete from one site to another generally make use of a metal mixing drum. The metal mixing drum is mounted to the vehicle and connected at one end to a drive assembly provided on the vehicle that applies the force needed to rotate the drum. The drive assembly is made up of a gear box that is generally powered by the engine of the vehicle. When the gear box is engaged, the engine provides the power or torque needed to rotate the metal mixing drum around its longitudinal axis. To mix the concrete while the truck is between sites, and to discharge the concrete when the truck reaches the desired location, the metal drum generally includes internal vanes or mixing blades. The vanes are arranged on the inside of the drum in a spiral fashion such that rotation of the drum in one direction mixes the concrete, and rotation of the drum in the opposite direction discharges the concrete through an opening provided on the end of the drum.

Although metal drums have been used for many years, they suffer from a number of disadvantages. First, the construction of metal drums is a relatively labor intensive activity that involves rolling steel sheets into conical portions and cylinders and then coupling the different portions together to form the outer shell of the drum. Once the outer shell of the drum is formed, the mixing blades provided on the inside of the drum generally need to be bolted or welded to the outer shell. Because of the extensive labor required in performing these and other operations, the cost to construct a metal drum can be relatively high.

Second, the internal surfaces of a metal drum tend to wear quickly due to the abrasion on the metal by the concrete, which is increased in the areas where there are abrupt changes in the inner surface of the drum. Thus, the areas in which the mixing blades are welded or bolted to the shell of the drum tend to be areas of increased abrasion that wear rapidly. Moreover, because the concrete tends to slide, rather than roll, along the inside surface of the metal drum, mixing of the concrete tends not to occur along the inside surface of the drum.

Third, metal drums can be relatively heavy due to the weight of the metal used in the construction of the drum. In view of vehicle load limits that place restrictions on the total weight of the vehicle, the heavier the drum, the less concrete can be placed in the drum for transportation to another site. Thus, a truck having a heavier drum may not be able to carry as much payload as a similar truck that has a lighter drum, increasing the long-term operating costs of the truck.

Finally, metal drums tend to absorb and retain heat from the environment and from the exothermic reaction that takes place between the different substances in the concrete. This additional heat retained by the drum tends to decrease the time during which the concrete begins to set. Thus, the distance over which concrete can be moved within mixing trucks that have metal drums is limited.

Attempts have been made to improve the conventional mixing drum. For example, it is known to coat the inside of a metal drum, including the mixing blades, with a resilient wear resistant material. However, while this may improve the wear and mixing characteristics of the traditional metal drum, the coating adds to both the weight of the drum and the costs of manufacturing the drum. Moreover, while reinforced plastic mixing blades have been used in such coated medal drums, the additional step of attaching the mixing blade to the drum requires an additional manufacturing step. It is also know to form the mixing drum from a reinforced plastics material and to then attach the mixing blades to the plastics material. However, like the metal drum, the additional step of attaching the mixing blades adds to the cost of manufacturing the drum.

Due to the differences in the material properties and characteristics of a metal drum and a polymer or composite drum, some devices and components employed in conventional drums will not work effectively with a composite drum. For example, components such as hatches and drive ring assemblies traditionally used with concrete drums are not compatible with a plastic or composite drum. Moreover, such conventional components tend to be relatively heavy and expensive to manufacture.

Accordingly, it would be advantageous to provide a mixing drum that is cost effective to make and use. It would further be advantageous to provide a mixing drum that is not as labor intensive to produce. It also would be advantageous to provide a mixing drum that is substantially resilient to wear. It would further be advantageous to provide a mixing drum that is capable of withstanding normal loads but is lighter than conventional metal drums. Moreover, it would be advantageous to provide a mixing drum that is not as susceptible to temperature increases as a conventional metal drum. Additionally, it would be advantageous to provide a mixing drum that effectively mixes concrete along the inside surface of the drum. It would also be advantageous to provide components for plastic or composite mixing drums that are suited to the particular properties of the plastic or composite drum and that are lighter and less costly than conventional components for metal mixing drums. It would still further be advantageous to provide a mixing drum that includes any one or more of these or other advantageous features.

BRIEF DESCRIPTION OF THE DRAWINGS

FIG. 4 is a partial cross-sectional view of the mixing drum illustrated in FIG. 1.

FIG. 5 is a fragmentary perspective view of a support member and a spacer according to an exemplary embodiment.

FIG. 6 is a cross-sectional view of a support member and a spacer shown within a mold.

FIG. 7 is an enlarged cross-sectional view of a portion of the mixing drum illustrated in FIG. 4.

FIG. 8 is an exploded perspective view of a hatch cover assembly according to one exemplary embodiment.

FIG. 10 is an exploded perspective view of a hatch cover assembly according to another exemplary embodiment.

FIG. 11 is a cross-sectional view of the hatch cover assembly illustrated in FIG. 10.

DETAILED DESCRIPTION OF THE EXEMPLARY EMBODIMENTS

Figure 1:
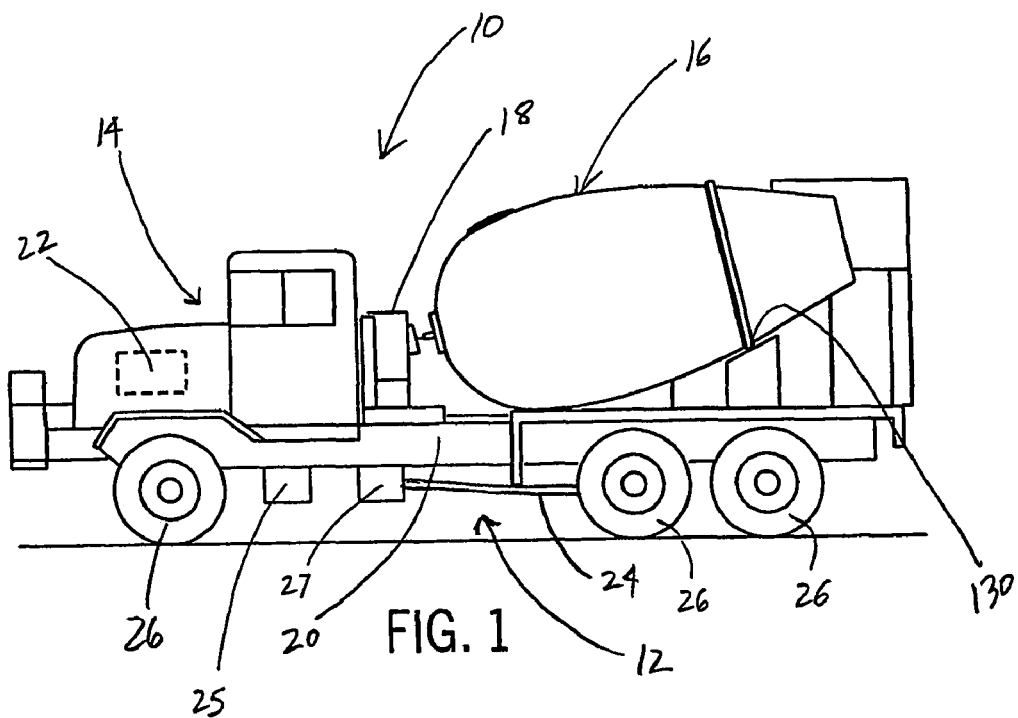
FIG. 1 is a side view of a concrete mixing vehicle having a mixing drum according to one exemplary embodiment.

FIG. 1 is an illustration of a concrete mixing truck 10, which includes a chassis 12, a cab region 14, a mixing drum 16, and a mixing drum drivetrain 18. Chassis 12 includes a frame 20, a power source 22, a drivetrain 24, and wheels 26. Frame 20 provides mixing truck 10 with the structural support and rigidity needed to carry heavy loads of concrete. Power source 22 is coupled to frame 20 and generally comprises a source of rotational mechanical energy which is derived from a stored energy source. Examples include, but are not limited to, an internal combustion gas-powered engine, a diesel engine, turbines, fuel cell driven motors, an electric motor or any other type of motor capable of providing mechanical energy.

For purposes of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Drivetrain 24 is coupled between power source 22 and wheels 26 and transfers power (or movement) from power source 22 to wheels 26 to propel truck 10 in a forward or rearward direction. Drivetrain 24 includes a transmission 25 and a wheel end reduction unit 27. Both transmission 25 and wheel end reduction unit 27 utilize a series or set of gears to adjust the torque transmitted by power source 22 to wheels 26. One example of a wheel end reduction unit is described in copending U.S. patent application Ser. No. 09/635,579, filed on Aug. 9, 2000, by Brian K. Anderson entitled NON-CONTACT SPRING DRIVE, the full disclosure of which is hereby incorporated by reference.

Cab region 14 is coupled to chassis 12 and includes an enclosed area from which an operator of truck 10 drives and controls at least some of the various functions of truck 10.

Drive assembly or drivetrain 18 is operatively coupled to power source 22 and mixing drum 16 and uses the power or movement from power source 22 to provide a rotational force or torque to mixing drum 16. According to an alternative embodiment, the drivetrain may be powered by a source other than power source 22 that is provided on truck 10.

Figure 3:
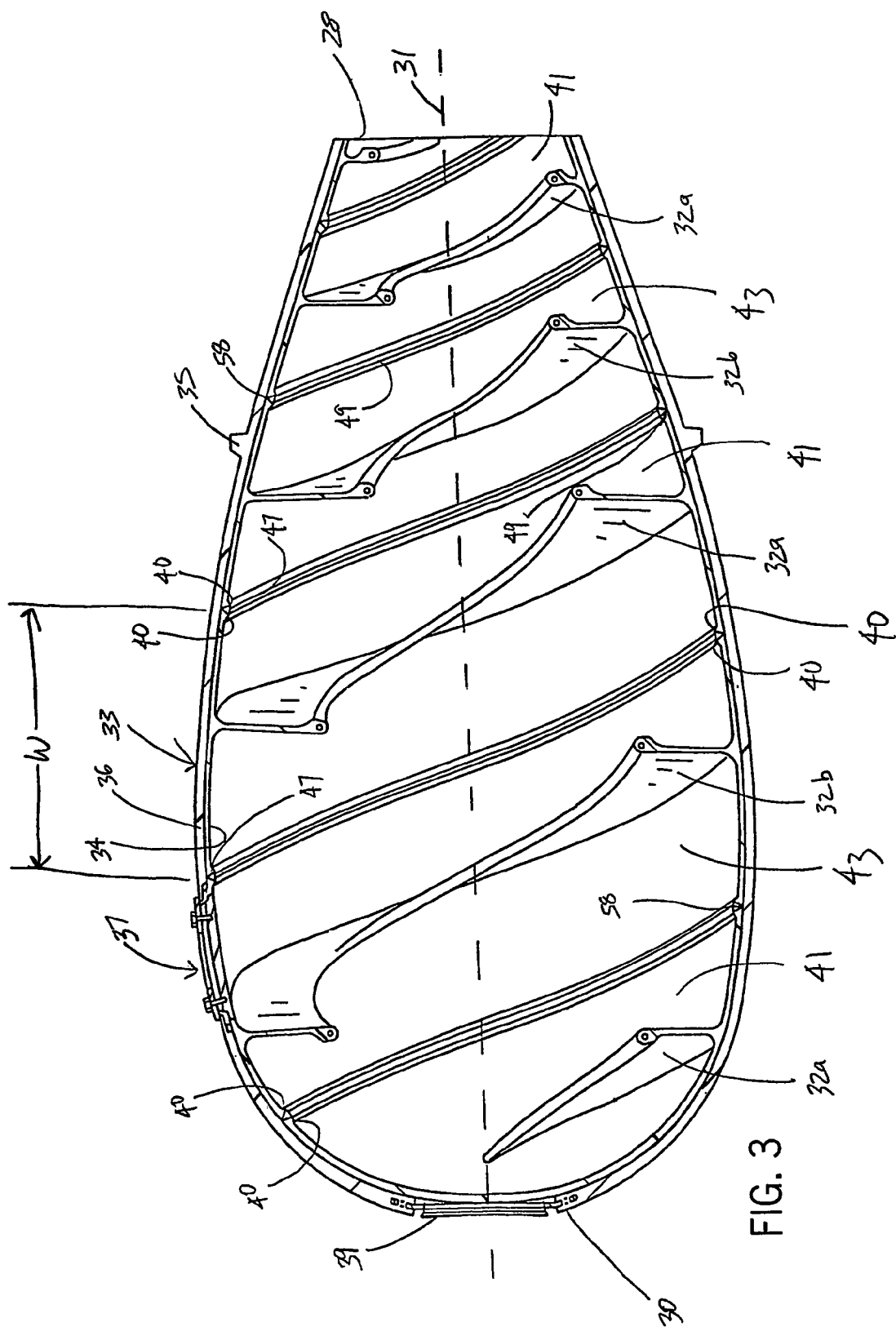
FIG. 3 is a cross-section view of the mixing drum illustrated in FIG. 1 taken along line 3-3.

Referring now to FIG. 3, mixing drum 16 includes a barrel 33, projections 32, ramps 40, a hatch cover assembly 37 or 200, a drive ring 39, and a roller ring 35. Barrel 33 is a generally teardrop- or pear-shaped container that has an opening 28 on one end (the smaller end) and a drive ring 39 (described below) coupled to the other larger end 30 of barrel 33. Barrel 33 includes an inner drum layer 34 and an outer drum layer 36. Inner drum layer 34 is made up of two spiral-shaped sections 41 and 43 that are "screwed" or mated together. Each of sections 41 and 43 is a substantially flat panel that is formed in the shape of a spiral around an axis that becomes a central axis 31 of barrel 33 when sections 41 and 43 are completely assembled. Each of sections 41 and 43 has a width W that extends substantially parallel to axis 31 of barrel 33 (or that extends generally along the length of the central axis) and a length that substantially circumscribes or encircles the axis 31. According to one exemplary embodiment, the width of each section varies along the length of each section, for example from between approximately 6 inches and 36 inches. Each of the sections 41 and 43 has a first edge 47 that extends the length of the section and a second edge 49 that extends the length of the section. Each of sections 41 and 43 is spiraled around the axis 31 of barrel 33 such that there is a gap between the first edge 47 of the section and the second edge 49 of the same section. This gap provides the space that will be filled by the other section when it is mated or screwed to the first section. Accordingly, when the sections 41 and 43 are assembled together to form inner drum layer 34, edge 47 of section 41 will abut edge 49 of section 43 and edge 49 of section 41 will abut edge 47 of section 43. A seam 58 is formed where the edges of sections 41 and 43 abut one another.

Once the two sections of the inner drum layer 34 have been assembled, outer drum layer 36 is formed as a continuous layer around the outer surface of inner drum layer 34. Accordingly, outer drum layer 34 extends continuously from one end of the barrel to the other and spans the seams between sections 41 and 43. Outer drum layer 36 is a structural layer that is made from a fiber reinforced composite material applied by winding resin coated fibers around the outer surface of inner drum layer 34. According to one embodiment, the resin is Hetron 942, available from Ashland Chemical, in Dublin, Ohio, and the fibers are fiberglass, preferably 2400 Tex E Glass (approximately 206 yards/lb). According to one embodiment, the angle at which the fibers are wound around the drum at the major axis (the location at which barrel 33 has the greatest diameter) is approximately 10.5 degrees relative to axis 31 of the barrel 33. During the winding process, the resin coated fibers are wrapped generally from one end of the drum to the other. According to one embodiment, the fibers are provide in a ribbon or bundle that is approximately 250 millimeter wide and includes 64 strands. The ribbon of fibers is wrapped around the drum such that there is an approximately 50% overlap between each pass of the ribbon. The wrapping the fibers from end to end, helps to provide drum 16 with the structural support to withstand the various forces that are applied to drum 16 in a variety of different directions.

According to an exemplary embodiment, projections 32 and ramps 40 are integrally formed a single unitary body with sections 41 and 43. Each of sections 41 and 43, and the corresponding projections and ramps, are formed through an injection molding process from polyurethane, and outer drum layer 36 is made using fiberglass fibers coated with a resin. According to other alternative embodiments, the inner drum layer and/or the outer drum layer may be made from any one or more of a variety of different materials including but not limited to polymers, elastomers, rubbers, ceramics, metals, composites, etc. According to still other alternative embodiments, other processes or components may be used to construct the drum. For example, according to various alternative embodiments, the inner drum layer may be formed as a single unitary body, or from any number of separate pieces, components, or sections. According to other alternative embodiments, the inner drum layer, or any of sections making up part of the inner drum layer, may be made using other methods or techniques. According to still other alternative embodiments, the outer drum layer may be applied over the inner drum layer using any one or more of a number of different methods or techniques.

Referring still to FIG. 3, projections 32a and 32b are coupled to sections 41 and 43, respectively, and extend inwardly toward central axis 31 of barrel 33 and along the length of the respective section. Accordingly, two substantially identical projections 32a and 32b are coupled to inner drum layer 34 and spiral around the inner surface of inner drum layer 34 in the shape of an archimedian spiral. In one embodiment, projection 32a and 32b extend from an axial end of barrel 33 across an arial midpoint of barrel 33. Projections 32a and 32b are circumferentially spaced apart around axis 31 by approximately 180 degrees. Because projections 32a and 32b are substantially identical, further references to the projections will simply refer to "projection 32" when discussing either (or both of) projection 32a or 32b.

A projection and one or more ramps are coupled to each section of inner drum layer 34. Because the projection and ramp(s) that are coupled to each section include substantially identical features and elements, where appropriate, the projection and ramps that are coupled to one section will be described, it being understood that the projection and ramps of the other section are substantially identical. FIG. 4 illustrates projection 32 and ramps 40a and 40b, which are coupled to section 41, in greater detail.

Projection 32 (e.g., fin, blade, vane, screw, formation, etc.) includes a base portion 42, an intermediate portion 44, and an end portion 46. Base portion 42 extends inwardly from section 41 toward the axis of drum 16 and serves as a transitional area between section 41 and intermediate portion 44 of projection 32. Such a transitional area is beneficial in that it tends to reduce stress concentrations in base portion 42 that may result from the application of force to projections 32 by the concrete. The reduction of the stress concentrations tends to reduce the likelihood that projection 32 will fail due to fatigue. To provide the transitional area, base portion 42 is radiused or tapered on each side of projection 32 to provide a gradual transition from section 41 to intermediate portion 44. To minimize any unwanted accumulation of set concrete, the radius is preferably greater than 10 millimeters. According to one exemplary embodiment, the radius is approximately 50 millimeters. According to another embodiment, the radius begins on each side of projection 32 proximate section 41 approximately three inches from the centerline of projection 32 and ends approximately five inches up the height H of projection 32, proximate intermediate region 44 of projection 32. Because drum 16 rotates, the orientation of any particular section of projection 32 constantly changes. Accordingly, to simplify the description of projection 32, the term "height," when used in reference to projection 32, will refer to the distance projection 32 extends inwardly toward the center axis of drum 16, measured from the center of base portion proximate section 41 to the tip of end portion 46. It should be noted, however, that the height of projection 32 changes along the length of projection 32. Consequently, the locations at which the radius or taper begins and/or ends, or the distance over which the radius or taper extends, may vary depending on the height and/or location of any particular portion of the projection. According to various alternative embodiments, the radius of the base region may be constant or it may vary. According to other alternative embodiments, the transition between the section and the intermediate portion of the projection may be beveled or may take the form of some other gradual transition. Moreover, the locations at which the transition or taper may begin or end may vary depending on the material used, the thickness of the inner drum wall, the height of the projection, the loads that will be placed on the projection, the location of a particular portion of the projection within the drum, and a variety of other factors.

According to any exemplary embodiment, the characteristics of the taper should be such that the projection is allowed to at least partially flex under the loads applied by the concrete. However, if the taper is such that it allows the projection to flex too much, the projection may quickly fatigue. One the other hand, if the taper is such that it does not allow the projection to flex enough, the force of the concrete on the projection may pry on inner drum layer 34 and potentially tear inner drum layer away from outer drum layer 36.

Intermediate portion 44 of projection 32 extends between base portion 42 and end portion 46. According to one embodiment, intermediate portion 44 has a thickness of approximately six millimeters and is designed to flex when force from the concrete is applied thereto.

End portion 46 of projection 32 extends from intermediate portion 44 toward the axis of drum 16 and includes a support member 48 and spacers 50. The thickness of end portion 46 is generally greater than the thickness of intermediate portion 44. Depending on where along the length of projection 32 a particular section of end portion 46 is provided, the added thickness of end portion 46 may be centered over intermediate portion 44 or offset to one side or the other. In some areas along the length of projection 32, end portion 46 is provided on only one side of intermediate portion 44 (e.g., the side closest to opening 28 or the side closest to end 30). In such a configuration, end portion 46 acts as a lip or flange that extends over one side of intermediate portion 44 and serves to improve the ability of projection 32 to move or mix concrete that comes into contact with the side of intermediate portion 44 over which end portion 46 extends. Due to the increased thickness of end portion 46 in relation to intermediate portion 44, end portion 46 includes a transitional region 45 that provides a gradual transition from intermediate portion 44 to end portion 46. According to an exemplary embodiment, the transitional region is radiused. According to alternative embodiments, the transitional region may be beveled or tapered. To minimize any wear or accumulation that may occur as a result of concrete passing over end portion 46, projection 32 terminates in a rounded edge 52.

According to various alternative embodiments, each of the base region, the intermediate region, and the end region may be different sizes, shapes, thicknesses, lengths, etc. depending on the particular situation or circumstances in which the drum will be used.

FIGS. 4-6 illustrate support member 48 in greater detail. As shown in FIGS. 4-6, support member or torsion bar 48 is an elongated circular rod or beam that is embedded within end portion 46 of projection 32 to provide structural support to projection 32. Torsion bar 48 has a shape that corresponds to the spiral-like shape of projection 32 and extends the entire length of projection 32. The ends of bar 48 have flared fibers that are embedded in inner drum layer 34. Torsion bar 48 serves to substantially restrict the ability of end portion 46 of projection 32 to flex when a load is applied to projection 32 by the concrete, and thereby prevents projection 32 from essentially being folded or bent over by the concrete. Although sufficiently rigid to support projection 32, torsion bar 48 is preferably torsionally flexible. The torsional flexibility of torsion bar 48 allows it to withstand torsional loads that result from some deflection of end portion 46 of projection 32. According to one exemplary embodiment, support member 48 is a composite material that is made primarily of carbon or graphite fibers and a urethane-based resin. According to one exemplary embodiment, the ratio of carbon fibers to the urethane-base resin is 11 pounds of carbon fiber to 9 pounds of urethane-based resin. One example of such a urethane-based resin is Erapol EXP 02-320, available from Era Polymers Pty Ltd in Australia. According to alternative embodiments, the support member may be made from any combination of materials that allows the support member to provide the desired structural support yet at the same time allows the torsion bar to withstand the torsional loads that may be applied to the torsion bar. For example, the torsion bar may be made from one or more of fiberglass fibers and ester-based resins. According to other alternative embodiments, the size and shape of the of the support member may vary depending on the particular circumstances in which the support member will be used.

According to an exemplary embodiment, support member 48 is made through a pulltrusion process. The pulltrusion process includes the steps of collecting a bundle of fibers, passing the fibers through a bath of resin, and then pulling the resin coated fibers through a tube. The support member 48 is then wrapped around an appropriately shaped mandrel and allowed to cure to give support member 48 the desired shape. The fibers are pulled through the tube by a cable of a winch that is passed through the tube and coupled to the fibers. To facilitate the coupling of the cable to the fibers, the fibers are doubled over and the cable is attached to the loop created by the doubled over fibers. The winch pulls the cable back through the tube, which, in turn, pulls the fibers through the tube. According to one exemplary embodiment, the urethane-based resin through which the fibers are passed before entering the tube is injected into the tube at various points along the length of the tube as the fibers are being pulled through the tube. According to alternative embodiments, the support member may be made by any one or more of a variety of different processes.

According to one exemplary embodiment, projection 32 and ramps 40 are integrally formed with each of sections 41 and 43 as a single unitary body and are made along with sections 41 and 43. As described above, each of sections 41 and 43, and the corresponding projection 32 and ramps 40, are preferably made through an injection molding process during which an elastomer is injected between molds. In order to embed support member 48 within end portion 46 of projection 32, support member 48 is placed in a mold 54 (a portion of which is shown in FIG. 6) that defines the shape of projection 32 prior to the injection of the elastomer. To keep support member 48 in the proper location within the mold during the injection process, spacers, shown as helical springs 50, are wrapped around the circumference of support member 48 and spaced intermittently along the length of support member 48. Each spring 50 is retained around the circumference of support member 48 by connecting one end of spring 50 to the other. When support member 48 and springs 50 are placed in the mold prior to the injection process, springs 50 contact an inside surface of mold 54 and thereby retain support member 48 in the proper location within mold 54.

When the elastomer is injected into the molds, the elastomer flows through spring 50 and surrounds (e.g., embodies, encapsulates, etc.) each of its coils. As a result, there is a continuous flow of the elastomer through spring 50, such that if the elastomer does not securely bond to the coils of spring 50, the areas along projection 32 where springs 50 are placed are not significantly weaker than the areas along projection 32 where there are no spring spacers 50. According to various alternative embodiments, other materials and structures may be used as spacers. For example, the spacer may be made from any one or more of a variety of materials including polyermers, elastomers, metals, ceramics, wood, etc. The spacer may also be any one of a variety of different shapes and configurations, including but not limited to, circular, rectangular, triangular, or any other shape. Moreover, the spacer may not substantially surround the support member, but rather may include one or more members that are provided intermittently around the periphery of the support member. According to other alternative embodiments, the spacer may be a flat disc or a cylinder having an outside diameter that contacts the inside surface of the mold and an aperture through which the support member passes. The flat disc or cylinder also may include a plurality of apertures extending therethrough to allow for the continuous flow of the injected elastomer through at least some areas of the disc.

FIGS. 4 and 7 illustrate ramps 40 in more detail. As shown in FIGS. 4 and 7, ramps 40a, 40b, 40c, and 40d are raised, ramp-like structures that extend inwardly from section 41 toward center axis 31 of barrel 33. Ramp 40a includes a surface 60a that extends toward center axis 31 as it approaches seam 58a, which is formed where edge 47 of section 41 abuts edge 49 of section 43. Ramp 40a also includes a surface 62a that extends from the end of surface 60a back toward section 41 and that terminates at seam 58a. Ramps 40b, 40c, and 40d include similar surfaces (which are labeled with the same reference numbers as ramp 40a followed by the respective letter designation corresponding to each ramp). Preferably, the ramps are provided in pairs, with one ramp on each side of a seam such that the seam is located within a channel or valley that is created by the ramps. Thus, ramp 40a cooperates with ramp 40c to provide a valley or channel 64a that is defined by surface 62a of ramp 40a and surface 62c of ramp 40c. Seam 58a lies at the base of channel 64a. Similarly, ramp 40b cooperates with ramp 40d to provide a valley or channel 64b that is defined by surface 62b of ramp 40b and surface 62d of ramp 40d. Seam 58b lies at the base of channel 64b. According to an exemplary embodiment, the peak of each ramp extends inwardly from section 41 toward the axis of the drum a distance P, which is approximately six millimeters.

According to various alternative and exemplary embodiments, the proportions and dimensions of the ramps may vary. For example, the distance of corresponding ramps from one another, the angle at which the ramp surfaces extend away from or toward the center axis of the barrel, the location along the wall of the barrel at which the ramp begins to extend toward the center axis of the barrel, the height of the peak of the ramps, etc. may all be varied to suit any particular application. According to another alternative embodiment, only one ramp may be provided proximate each seam.

To facilitate the assembly of sections 41 and 43, sections 41 and 43 of inner drum layer 34 are substantially free of any structures that would help to align sections 41 and 43 with one another. While such structures would help align sections 41 and 43 and possibly reduce any seams that may be provided in inner drum layer 34, such structures may tend to complicate the assembly of sections 41 and 43. In the absence of such alignment structures, sections 41 and 43 are assembled such that one section simply abuts the other section. While allowing the sections to abut one another tends to facilitate the assembly of sections 41 and 43, the absence of any alignment structures on sections 41 and 43 may mean that the edges of sections 41 and 43 may not always be perfectly aligned with one another. As a result, inner drum layer 34 may include seams 58*a* and 58*b*. In the absence of ramps 40*a*, 40*b*, 40*c*, and 40*d*, seams 58*a* and 58*b* may tend to create high wear points due to the aggregate that would build up in and around the seam. Ramps 40*a*, 40*b*, 40*c*, and 40*d* help to minimize this wear by directing the concrete away from seams 58*a* and 58*b*. To further minimize any wear that may occur in the area around seams 58*a* and 58*b*, each of channels 64*a* and 64*b* is filled with a filler material 66. When channels 64*a* and 64*b* are filled with filler material 66, the concrete within drum 16 passes over the ramps 40*a*, 40*b*, 40*c*, and 40*d* and over the filler material. Accordingly, any wear that may occur proximate the seams 58*a* and 58*b* is reduced. According to an exemplary embodiment, the filler material is the same general material from which the inner drum layer is made. According to various alternative embodiments, the filler material may be any one or more of a variety of different materials, including but not limited to polymers, elastomers, silicones, etc.

Figure 9:
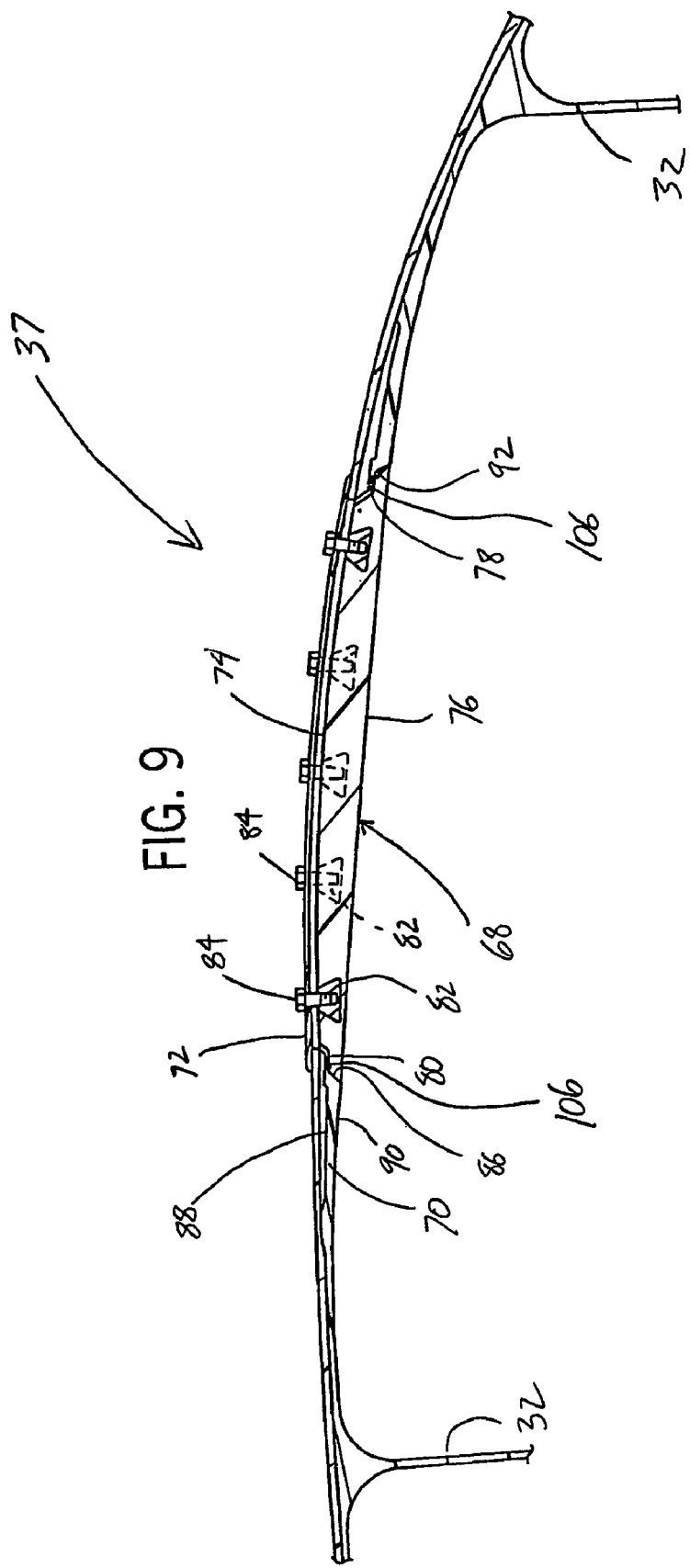
FIG. 9 is a cross-sectional view of the hatch cover assembly illustrated in FIG. 8.

Referring now to FIGS. 8 and 9, a hatch cover assembly 37 is shown according to one exemplary embodiment. Hatch cover assembly 37 includes a hatch cover 68 and a plate 72 and is intended to close and seal an opening or aperture 67 that is provided in barrel 33. According to one embodiment, opening 67 is generally oval-shaped, having a major axis of approximately 19.5 inches and a minor axis of approximately 15.5 inches. According to other alternative embodiments, the opening may have any one of a variety of different shapes and have a variety of different sizes. According to one exemplary embodiment, opening 67 has a size that is sufficient to allow a person to pass through the opening to gain access to the inside of barrel 33. The opening 67 may size to allow the concrete with barrel 33 to drain out through the opening 67. Hatch cover 68 (e.g., cover, door, closure, plate, etc.) is a generally circular or oval-shaped flat panel that includes an outer surface 74 and an inner surface 76. For purposes of describing the hatch cover assemblies, references to an "inner" or "inside" surface refer to the surface that is closest to or that faces the inside of drum 16, while references to an "outer" or "outside" surface refer to the surface that is closest to or faces the outside of drum 16. A recess 78 that extends into outer surface 74 of hatch cover 68 for approximately half the thickness of hatch cover 68 is provided on the outer periphery of hatch cover 68. Recess 78 has the effect of creating a flange or shoulder 80, which extends around the periphery of hatch cover 68 proximate inner surface 76, and a raised region 81, which extends from the center of hatch cover 68, each having a thickness equal to approximately half the thickness of hatch cover 68. Hatch cover 68 also includes coupling members (e.g., receiving members, fasteners, inserts, etc.) shown as threaded nuts 82 that are embedded into outer surface 74 of raised region 81. Nuts 82 are arranged in a pattern such that when the coupling members (e.g. posts, beams, pins, etc.), shown as bolts or studs 84, are coupled to nuts 82, bolts 84 extend through plate 72 and through opening 67.

Plate 72 (e.g., panel, cover, bolt plate, retaining ring, etc.) is a generally circular or oval-shaped disc that has an outside periphery that extends beyond (or overlaps) the periphery of opening 67 in drum 16. Plate 72 includes a plurality of apertures 102 that are configured to allow bolts 84 to pass through plate 72 and couple to nuts 82 in hatch cover 68. According to an exemplary embodiment, plate 72 includes an opening 100 that extends through the center of plate 72. According to an alternative embodiment, the plate may not include opening 100, but rather may be a substantially solid disc.

According to an exemplary embodiment, a panel 70 that substantially surrounds opening 67 is incorporated into drum 16. Panel 70 (e.g., plate, surround, support panel, etc.) is a generally circular or oval-shaped panel that is intended to reinforce and structurally support drum 16 in the areas surrounding opening 67. Panel 70 has an outer periphery that extends beyond (or overlaps) the outer periphery of hatch cover 68 as well as an opening 86 that is configured to receive hatch cover 68. Panel 70 includes an outer surface 88 and an inner surface 90. An annular recess 92, provided around opening 86 on inner surface 90, is configured to receive shoulder 80 of hatch cover 68. The depth of recess 92 (i.e., the distance the recess extends into panel 70) is approximately equal to the thickness of shoulder 80, which allows inner surface 76 of hatch cover 68 to be substantially flush with inner surface 90 of panel 70. By making inner surface 76 flush with the inside surface of inner drum layer 34, the inner surface of inner drum layer 34 remains generally smooth, which helps to avoid the build up of aggregate that tends to occur where there are abrupt changes in the inner surface of a drum.

According to an exemplary embodiment, panel 70 is made separately from sections 41 and 43 of inner drum layer 34 and is incorporated into inner drum layer 34 during the assembly of drum 16. According to one exemplary embodiment, panel 70 is incorporated into inner drum layer 34 by removing a section of inner drum layer 34 and replacing it with panel 70. By incorporating panel 70 into inner drum layer 34 in this manner, a seam is formed between panel 70 and inner drum layer 34. To minimize excessive wear in this seam area, the seam is filled with a filler material in much the same way that the seams between sections 41 and 43 are filled with a filler material. According to an alternative embodiment, one or more ramps may be provided on one or both sides of the seam to help direct concrete away from the seam. Preferably, panel 70 is inserted or incorporated into inner drum layer 34 before outer drum layer 36 is applied. If this is done, the outer drum layer 36 will initially cover opening 86 in panel 70. This area of outer drum layer 36 is then cut out to provide an opening 67 in drum 16 that provides access to the interior of drum 16.

To help maintain a consistent, smooth appearance and surface on both the inside and outside of drum 16, the panel may include various bevels and/or tapers on one or more of the different surfaces of the panel. Such bevels or tapers are preferably angled such that they follow the contour of the corresponding surfaces of the drum when outer drum layer 36 is applied over panel 70. According to another alternative embodiment, the entire outer surface and/or inner surface of the panel may be contoured such that the panel follows the general shape of the drum.

To cover and seal opening 67 provided in drum 16, hatch cover 68, panel 70, and plate 72 are arranged such that outer surface 88 of panel 70 is proximate the inner surface of outer drum layer 36, hatch cover 68 is placed within panel 70 with raised region 81 extending through opening 86 in panel 70, and plate 72 is placed on the outside surface of barrel 33 with bolts 84 extending though apertures 102 of plate 72 into nuts 82 in hatch cover 68. As bolts 84 are tightened, hatch cover 68 is pulled toward plate 72. As hatch cover 68 is pulled toward plate 72, hatch cover 68 presses against panel 70. When bolts 84 are fully tightened, hatch cover 68 is pressed against panel 70 with enough force to seal opening 67 in barrel 33. At the same time, plate 72 is pressed against the outside surface of drum 16. Essentially, hatch cover assembly 37 closes and seals opening 67 by "sandwiching" or clamping barrel 33 between hatch cover 68 and plate 72. By utilizing this clamping or sandwiching action, hatch cover assembly 37 avoids the need to drill holes in barrel 33, which, if not properly reinforced, may create stress concentrations in barrel 33 that may lead to failure.

To further improve the sealing ability of hatch cover assembly 37, a seal 106 (e.g., gasket, o-ring, grommet, etc.) is optionally provided between hatch cover 68 and panel 70. According to alternative embodiments, the seal may be made from a any one or more of a variety of different materials, including rubbers, silicone based materials, polymers, elastomers, etc. According to other alternative embodiments, the seal made be applied or incorporated in the hatch cover assembly in a solid form or in a paste or liquid form.

According to an exemplary embodiment, each of hatch cover 68, panel 70, and plate 72 are made from the same fiber reinforced composite that is used in the construction of outer drum layer 36. The inner surface 76 of hatch cover 68 and inner surface 90 of panel 70 are coated with the same material from which inner drum layer 34 is made, preferably polyurethane. This helps to provide inner surface 76 and inner surface 90 with the wear resistant properties possessed by other areas of inner drum layer 34.

According to an exemplary embodiment, raised region 81 of hatch cover 68 extends through opening 86 such that the outer surface of raised region 81 is substantially flush with the outer surface of barrel 33. According to an alternative embodiment, the hatch cover may not include the raised region, but rather the hatch cover may be a substantially flat panel. According to other alternative embodiments, either or both of the inner and outer surfaces of the panel and the hatch cover may be flat or may contoured to the correspond to the shape of the drum. According to other alternative embodiments, the hatch, panel, and plate may be made from a variety of other suitable materials. According to still other alternative embodiments, the hatch, panel, and/or plate may be partially or completely coated with the material from which inner drum layer 34 is made or with any one of a variety of different materials.

According to other various alternative embodiments, different methods, techniques, and coupling members may be used to couple hatch cover 68 to plate 72. For example, bolts or studs may be coupled to the coupling member embedded in the hatch cover such that the studs extend through the panel and the plate and nuts are screwed onto the portion of the stud that extends beyond the plate. Alternatively, coupling members may be embedded in the plate rather than in the hatch. Moreover, the hatch cover may include tapped holes, rather than embedded nuts, into which a bolt or a stud may be screwed. According to still other alternative embodiments, various levers, snapping devices, wedges, cams, and/or other mechanical or electrical devices may be used to couple the hatch cover and the plate.

According to still other alternative embodiments, that hatch, panel, and plate may take different shapes, sizes and configurations. For example, various portions of the hatch, panel and/or plate may be angled, beveled, recessed, etc. or may include various raises regions, protrusions, shoulders, etc. to facilitate the coupling or mating of the hatch, panel and/or plate. Moreover, different portions of the hatch, panel, and plate may be different sizes and shapes to account for changes in the thicknesses of the inner or outer drum layer, the location of the opening in the barrel, the particular use of the drum, and a plurality of other factors.

According to another alternative embodiment, panel 70 may be excluded from the drum. Rather, the hatch cover and plate may press against the one or more of the inner drum layer and the outer drum layer when the hatch cover is coupled to the plate. Moreover, one or both of the inner drum layer and the outer drum layer may include various recesses, tapers, shoulders, extensions, configurations, etc. that are intended to receive cooperating structures provided on the hatch cover and/or plate.

Referring now to FIGS. 10 and 11, a hatch cover assembly 200 is shown according to another exemplary embodiment. Hatch cover assembly 200 includes a hatch cover 202 and a panel 204. Hatch cover 202 (e.g., door, closure, plate, etc.) is a generally circular or oval-shaped flat panel that includes an outer surface 206 and an inner surface 208. A recess 218 that extends into outer surface 206 of hatch cover 202 for approximately half the thickness of hatch cover 202 is provided on the outer periphery of hatch cover 202. Recess 218 has the effect of creating a shoulder 220, which extends around the periphery of hatch cover 202 proximate inner surface 208, and a raised region 222, which extends from the center of hatch cover 202, each having a thickness equal to approximately half the thickness of hatch cover 202. Hatch cover 202 also includes coupling members (e.g., receiving members, fasteners, inserts, etc.), shown as threaded nuts 210, that are embedded into the outer surface of recess 218 in a generally circular or oval pattern. The pattern of nuts 210 is such that bolts or studs 212 screwed into nuts 210 extend through openings 214 in drum 16 (rather than through the drum opening 67).

Panel 204 (e.g., plate, surround, support panel, etc.) is a generally circular or oval-shaped panel that is intended to reinforce and structurally support drum 16 in the areas surrounding opening 67. Panel 204 has an outer periphery that extends beyond (or overlaps) the outer periphery of hatch cover 202 as well as an opening 216 that is configured to receive hatch cover 202. Panel 204 includes an outer surface 224 and an inner surface 226. An annular recess 228, provided around opening 216 on inner surface 226, is configured to receive shoulder 220 of hatch cover 202. The depth of recess 228 (i.e., the distance the recess extends into panel 70) is approximately equal to the thickness of shoulder 220, which allows inner surface 208 of hatch cover 202 to be substantially flush with inner surface 226 of panel 204. A plurality of holes 230 that are configured to receive bolts 212 extend through panel 204. Holes 230 are arranged in a pattern that corresponds to that pattern in which nuts 210 are arranged.

When hatch cover assembly 200 is in the closed position, outer surface 206 of hatch cover 202 presses against inner surface 226 of panel 204. In this position, shoulder 220 of hatch cover 202 is received within recess 228, and raised region 222 of hatch cover 202 extends into opening 216 in panel 204. Accordingly, inside surface 208 of hatch cover 202 is substantially flush with the inside surface of inner drum layer 34. By making inside surface 208 flush with the inside surface of inner drum layer 34, the inner surface remains generally smooth, which helps to avoid the build up of aggregate that tends to occur where there are abrupt changes in the inner surface of a drum.

To further improve the sealing ability of hatch cover assembly 200, a seal 221 (e.g., gasket, o-ring, grommet, etc.) is optionally provided between hatch cover 202 and panel 204. According to alternative embodiments, the seal may be made from a any one or more of a variety of different materials, including rubbers, silicone based materials, polymers, elastomers, etc. According to other alternative embodiments, the seal made be applied or incorporated in the hatch cover assembly in a solid form or in a paste or liquid form.

According to an exemplary embodiment, raised region 222 of hatch cover 202 extends through opening 216 such that the outer surface of raised region 222 is substantially flush with the outer surface of barrel 33. According to an alternative embodiment, the hatch cover may not include the raised region, but rather the hatch cover may be a substantially flat panel. According to other alternative embodiments, either or both of the inner and outer surfaces of the panel and the hatch cover may be flat or may contoured to the correspond to the shape of the drum.

According to various alternative embodiments, that hatch cover and the panel may take different shapes, sizes and configurations. For example, various portions of the hatch cover and/or panel may be angled, beveled, recessed, etc. or may include various raises regions, protrusions, shoulders, etc. to facilitate the coupling or mating of the hatch cover with the panel. Moreover, different portions of the hatch cover and panel may be different sizes and shapes to account for changes in the thicknesses of the inner or outer drum layer, the location of the opening in the drum, the particular use of the drum, and a plurality of other factors. According to other alternative embodiments, the hatch cover assembly may also include a bolt plate (or washer) on the outside of the drum that includes apertures through which the bolts can pass and be coupled to the hatch.

Panel 204 is incorporated into inner drum layer 34 in much the same way that panel 70 is incorporated into inner drum layer 34. A section of inner drum layer 34 is removed and replaced by panel 204, and the seam formed between panel 204 and inner drum layer 34 is filled with a filler material as described above with respect to hatch cover assembly 37. Preferably, panel 204 is inserted or incorporated into inner drum layer 34 before outer drum layer 36 is applied. If this is done, outer drum layer 36 will initially cover opening 216 in panel 204. This area of outer drum layer 36 is then cut out to provide an opening 67 in barrel 33 that provides access to the interior of drum 16. According to an alternative embodiment, ramps may be provided on one or both sides of the seam around panel 204 in the same fashion they are provided on one or both sides of the seams between the two sections of the inner drum layer.

In hatch cover assembly 200, panel 204 is intended to serve as a reinforcing or structural member that enables the area of barrel 33 around opening 67 to withstand the forces that are applied to barrel 33 by the various components of hatch cover assembly 200 and the concrete within the drum. The inclusion of holes 214 in barrel 33 tends to weaken barrel 33 in the area around hatch cover assembly 200. Accordingly, structural support for barrel 33 is beneficial in that it helps barrel 33 withstand forces that it may not be able to withstand in the absence of panel 204.

According to an exemplary embodiment, panel 204 and hatch cover 202 are made from a fiber reinforced composite material. To provide panel 204 and hatch cover 202 with the wear resistant characteristics that are possessed by the other internal structures of drum 16, panel 204 and hatch cover 202 are preferably coated, in whole or in part, with an elastomer such as polyurethane.

Figure 14:
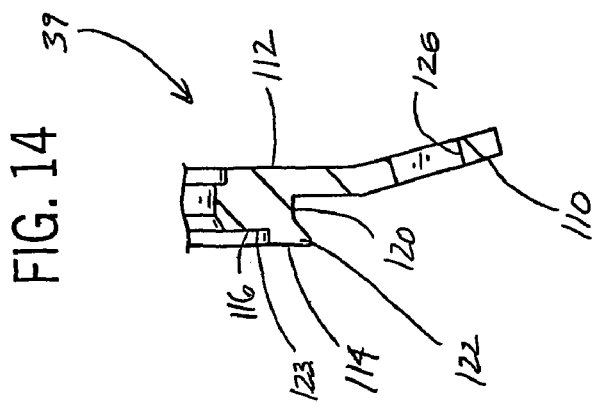
FIG. 14 is a partial cross-sectional view of the drive ring illustrated in FIG. 12.
Figure 13:
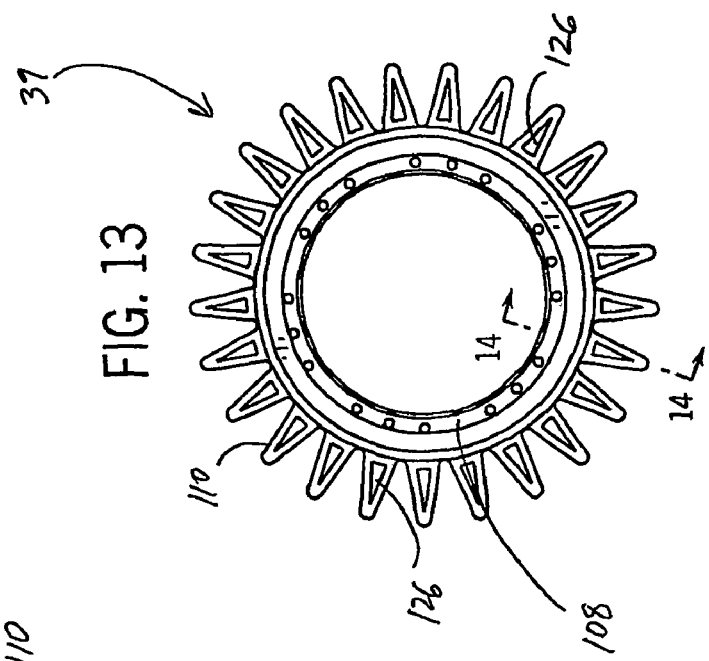
FIG. 13 is a top view of the drive ring illustrated in FIG. 12.
Figure 12:
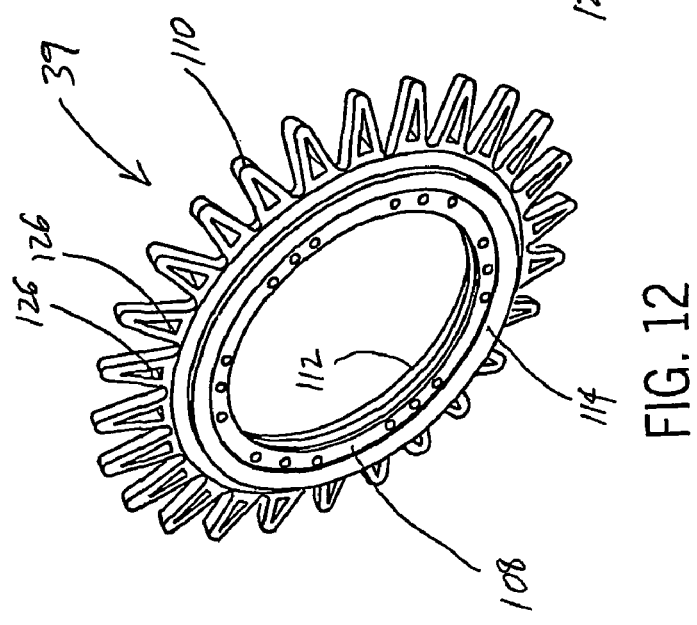
FIG. 12 is a perspective view of a drive ring according to an one exemplary embodiment.

Referring now to FIGS. 12-14, drive ring 39 (e.g. sprocket, spider, daisy, etc.) includes a hub 108 and extensions 110. Hub 108 (e.g., mount, coupling, etc.) is a generally cylindrical member that is designed to couple to mixing drum drivetrain 18. Hub 108 includes an inner side 112 (i.e., the side of hub 108 that faces drum 16) and an outer side 114 (i.e., the side of hub 108 that faces away from drum 16). A circular recess 116, which helps to facilitate the secure coupling of drivetrain 18 to hub 108, is provided in outer side 114. The diameter of recess 116 is such that the circumference of recess 116 lies approximately half way between an inner diameter 118 and an outer diameter 120 of hub 108. Apertures 121, which allow hub 108 to be bolted or otherwise coupled to mixing drum drivetrain 18; are spaced circumferentially around a base 123 of recess 116. A flange 122, which also facilitates the coupling of hub 108 to mixing drum drivetrain 18, extends radially outwardly from outer diameter 120 proximate outer side 114 of hub 108. An inner side 124 of flange 122 is tapered and gradually extends from the circumference of flange 122 toward outer diameter 120 of hub 108 as flange 122 extends toward drum 16. According to various alternative embodiments, the hub may be configured to be coupled to any one of a variety of different mixing drum drivetrains. Accordingly, the hub may take any one of a variety of different shapes and include any one or more of a variety of different features or elements that allow the hub to be coupled to a particular drive drivetrain.

A plurality of extensions 110 (e.g., fingers, projections, spikes, tangs, etc.) are spaced apart along the circumference of hub 108 and generally extend from hub 108 proximate inner side 112. According to an exemplary embodiment, each extension is a generally rectangular or triangular member that extends both radially outwardly from hub 108 and away from inner side 112 of hub 108. According to another exemplary embodiment, each extension is a generally triangular member. Each extension 110 includes an aperture or opening 126 that extends through the center of each extension 110 and that has the same general shape as the outline or periphery of extension 110.

Figure 15:
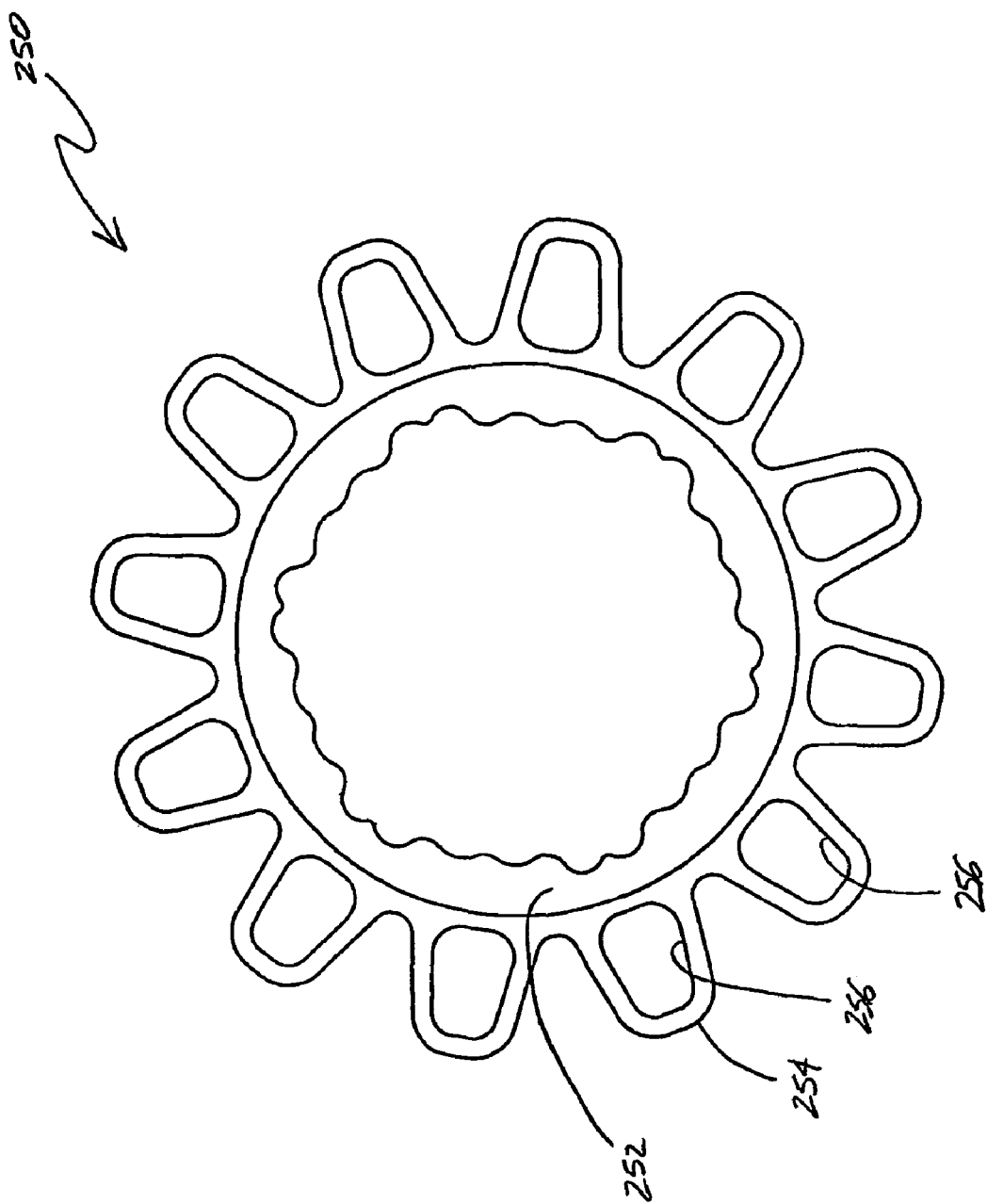
FIG. 15 is a top view of a drive ring according to another exemplary embodiment.

FIG. 15 illustrates another exemplary embodiment of a drive ring. Drive ring 250 (e.g. sprocket, spider, daisy, etc.) includes a hub 252 and extensions 254. Hub 252 (e.g., mount, coupling, etc.) is a generally cylindrical member that is designed to couple to mixing drum drivetrain 18. Hub 252 is substantially similar to hub 108 described above in relation to drive ring 39, except extra material between the holes is removed to reduce the weight of drive ring 250. According to various alternative embodiments, the hub may be configured to be coupled to any one of a variety of different mixing drum drivetrains. Accordingly, the hub may take any one of a variety of different shapes and include any one or more of a variety of different features or elements that allow the hub to be coupled to a particular drive drivetrain.

A plurality of extensions 254 (e.g., fingers, projections, spikes, tangs, etc.) are spaced apart along the circumference of hub 252 and generally extend from hub 252. According to an exemplary embodiment, each extension is a generally rectangular member that extends both radially outwardly from hub 252 and away from hub 252. Each extension 254 includes an aperture or opening 256 that extends through the center of each extension 254 and that has the same general shape as the outline or periphery of extension 254.

According to various exemplary and alternative embodiments, the drive ring may include no extensions or it may include up to or over 20 extensions. According to one exemplary embodiment, the drive ring includes 12 extensions. Generally, the smaller the extensions, the more extensions may be provided around the hub. According to other exemplary embodiments, the space S between the extensions ranges from 0 to 6 inches. According to other exemplary embodiments the aperture provided in the extensions is of size that is sufficient to allow resin used in the construction of outer drum layer 36 to infiltrate or enter the aperture. According still other alternative or exemplary embodiments, the apertures may be larger or smaller, which as the effect of reducing or increasing the weight of the drive ring. According to still other exemplary embodiments, the extensions angle away from the side of the hub that is closest to the barrel by approximately 15 degrees. According to one exemplary embodiment, the extensions angle such that the contour with the shape of the drum.

According to an exemplary embodiment, the drive rings are cast from an off-tempered ductile iron, preferably an 805506 ductile iron. According to various alternative embodiments, the drive ring may be made from one or more of a variety of different materials using one or more of a variety of different methods. For example, the hub could be made separately from the extensions, and then the two could be welded, bolted, or otherwise coupled together to form the drive ring. According to other alternative embodiments, dimensions (such as the thicknesses, widths, heights, etc.) of the hub and extensions may be varied depending on the specific application in which the drive ring will be used.

The drive rings are preferably coupled or attached to larger end 30 of drum 16 while the outer drum layer 36 is being applied over inner drum layer 34. This allows the fibers that are wrapped around inner drum layer 34 to be wrapped or woven between and/or around each of the extensions, or even through the apertures. This also allows the resin used to make outer drum layer 36 to enter and fill the spaces between the extensions as well as the spaces provided by the apertures in the extensions. The infiltration of the resin and the weaving of the fibers around and through the extensions helps to strengthen the connection of the drive ring to drum 16 and helps to distribute the loads that are transferred between drum 16 and the drive ring. Because the extensions are incorporated into drum 16, the extensions extend from the drive ring at an angle that allows the extensions to fit within the contour of drum 16.

According to various alternative embodiments, the apertures and/or the extensions may be any one of a variety of different shapes, such as rectangular, trapezoidal, oval, circular, etc. Moreover, any one or more of the apertures and/or the extensions may be shaped differently than one or more of the other apertures and/or extensions. According to other alternative embodiments, the extensions may be solid and not include apertures. According to still other alternative embodiments, the angle or orientation of the extensions with respect to the drive ring may be varied to accommodate different drum shapes and configurations.

Referring back to FIGS. 1-3, drum 16 also includes roller ring 35. Roller ring 35 is a circular member that fits around the outside of drum 16 at a location approximately one-third of the way from the smaller end of drum 16 toward larger end 30. A surface 128 provided on the outer diameter of roller ring 35 is configured to serve as the surface against which rollers 130 (illustrated in FIG. 1) (which support a portion of the weight of drum 16 along with drivetrain 18 and drive ring 39) ride as drum 16 rotates. According to an exemplary embodiment, roller ring 35 is made from a polymer material. According to various alternative embodiments, the roller ring is made from one or more of a variety of different materials, including but not limited to metals, plastics, elastomers, ceramics, composites, etc.

Figure 2:
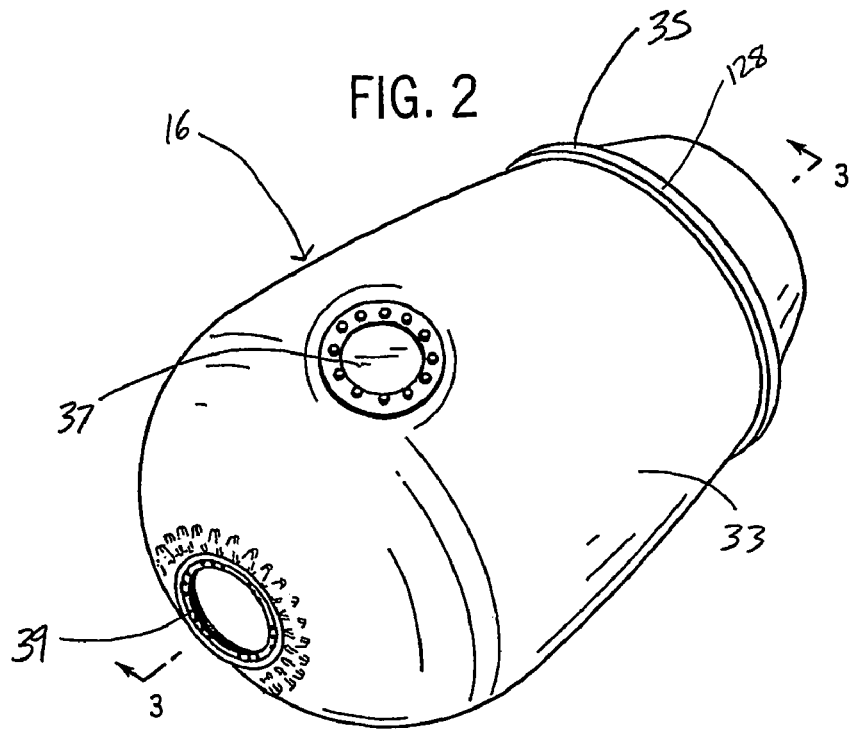
FIG. 2 is a perspective view of the mixing drum illustrated in FIG. 1.

Referring now to FIGS. 2 and 3, mixing drum 16 is coupled to, and supported by, chassis 12 of truck 10 and is configured to be at least partially filled with concrete such that when concrete is desired in a particular location, the concrete is loaded within drum 16 and transported to the desired location by truck 10. The spiral configuration of each projection 32 provides a screw- or auger-like action when drum 16 is rotated. Depending on the direction of rotation of drum 16, projections 32 will either force the concrete within drum 16 out of opening 28, or projections 32 will force the concrete toward larger end 30, which tends to mix the concrete. Accordingly, while the concrete is being transported within drum 16, mixing drum drivetrain 18 applies a torque to drum 16 that causes drum 16 to rotate about its longitudinal axis 31 in a first direction that results in the mixing of the concrete. Once truck 10 reaches the destination where the concrete is desired, mixing drum drivetrain 18 applies a torque to drum 16 that causes drum 16 to rotate about its longitudinal axis in a direction opposite the first direction, which discharges the concrete out of opening 28. As drum 16 rotates and the concrete within drum 16 contacts and applies a force to projections 32, tapered base portion 42 and support member 48 help to prevent projection 32 from failing or bending over under the load of the concrete. Moreover, as the concrete is moved within drum 16, it will travel over the seams between sections 41 and 43 of inner drum wall 34. Ramps 40 help to reduce the wear in the areas around the seams by directing the concrete away from the seam. Hatch cover assemblies 37 and 200 cover opening 67 provided within barrel 33 and help to seal the opening and prevent the concrete from escaping through opening 67. Hatch cover assemblies 37 and 200 also couple to barrel 33 in such a way that does not significantly weaken barrel 33 in the areas around opening 67. The design of drive rings 18 and 250 allows either one of them to be coupled to barrel 33 and withstand the various forces applied to drive rings 18 and 250 and barrel 33. The apertures in drive rings 18 and 250 also help to reduce weight.

The composite and plastic construction of the drum helps effective mixing allow the inner surfaces of the drum, and helps to minimize any heat that may be retained within drum. The materials and processes used to construct the drum also allow the drum to be manufactured with minimal labor, to maintain a relatively light weight, to withstand the normal loads, and to be more resistant to wear than conventional metal mixing drums. Moreover, the drive rings and hatch cover assemblies effectively perform the functions of similar devices used in metal mixing drums and at the same time are compatible with a composite or plastic drum. The drive rings and hatch cover assemblies may also be produced cheaper and lighter than the metal mixing drum counterparts.

Although the present inventions are been described in relation to a single drum, it should be understood that the different exemplary and alternative embodiments may be used together, or they may be used separately, in one or more different mixing drums.

Although the present inventions have been described with reference to exemplary embodiments, workers skilled in the art will recognize that changes may be made in form and detail without departing from the spirit and scope of the invention. For example, although different exemplary embodiments may have been described as including one or more features providing one or more benefits, it is contemplated that the described features may be interchanged with one another or alternatively be combined with one another in the described exemplary embodiments or in other alternative, embodiments. Because the technology of the present invention is relatively complex, not all changes in the technology are foreseeable. The present invention described with reference to the exemplary embodiments and set forth in the following claims is manifestly intended to be as broad as possible. For example, unless specifically otherwise noted, the claims reciting a single particular element also encompass a plurality of such particular elements.

What is claimed is:

1. A concrete mixing truck for transporting concrete from one location to another comprising:
    a chassis including: a frame, a first power source coupled to the frame, wheels coupled to the frame, and a first drivetrain coupling the first power source and the wheels;
    a mixing drum coupled to the frame and to a second drivetrain, the drum comprising:
        a wall including an inner surface defining a volume and an outer surface; and
        at least one formation coupled to the wall and extending from the inner surface of the wall, the formation including a body, a support member and at least one spacer disposed proximate the support member, the body including a base region, an intermediate region and an end region, the support member and the at least one spacer being embedded within the end region, the at least one spacer being a helical spring that resiliently engages and substantially surrounds the support member, the helical spring extending from the support member to an exterior of the body.

2. The concrete mixing truck of claim 1, wherein the formation and the wall are integrally formed as part of a single unitary body.

3. The concrete mixing truck of claim 1, wherein the second drivetrain is coupled to the first power source.

4. The concrete mixing truck of claim 1, wherein the body is a first material and wherein the first material flows around the at least one spacer when the first material is in an uncured state.

5. The concrete mixing truck of claim 4, wherein the at least one spacer includes at least one aperture through which the first material flows to encapsulate at least a portion of the at least one spacer.

6. The concrete mixing truck of claim 1, wherein the at least one spacer includes an outside diameter and an inside diameter.

7. The concrete mixing truck of claim 6, wherein at least a portion of the outside diameter of the at least one spacer lies on the surface of the body.

8. The concrete mixing truck of claim 1, wherein the support member is torsionally flexible.

9. The concrete mixing truck of claim 1, wherein the support member is a composite.

10. The concrete mixing truck of claim 9, wherein the composite includes fibers and a resin.

11. The concrete mixing truck of claim 10, wherein the fibers include one of carbon and graphite fibers.

12. The concrete mixing truck of claim 10, wherein the resin is a urethane-based resin.

13. The concrete mixing truck of claim 1, wherein the support member has a circular cross-section.

14. The concrete mixing truck of claim 1, wherein the base region of the formation is tapered.

15. The concrete mixing truck of claim 14, wherein the greatest width of the base region is approximately six inches.

16. The concrete mixing truck of claim 15, wherein the greatest height of the base region is approximately five inches from the inside surface of the mixing drum.

17. The concrete mixing truck of claim 1, wherein the wall includes at least one seam.

18. The concrete mixing truck of claim 17, further comprising a ramp extending from the inner surface of the wall proximate the seam.

19. The concrete mixing truck of claim 1, wherein the drum further comprises a drive ring coupled to the wall.

20. The concrete mixing truck of claim 1, wherein the wall includes an opening.

21. The concrete mixing truck of claim 20, wherein the drum includes a hatch cover engaging the opening.

22. The concrete mixing truck of claim 21, wherein the hatch cover includes a first panel on a first side of the opening and a second panel on a second side of the opening, and wherein the first panel is coupled to the second panel.

23. The concrete mixing truck of claim 1, wherein the formation comprises a mixing drum blade.

24. The concrete mixing truck of claim 1, wherein the formation extends around the inner surface of the wall in the form of an archimedial spiral.

25. The concrete mixing truck of claim 1, wherein the wall comprises an inner layer and an outer layer.

26. The concrete mixing truck of claim 25, wherein the inner layer is an elastomeric material.

27. The concrete mixing truck of claim 25, wherein the outer layer is a fiber reinforced composite material.

28. The concrete mixing truck of claim 25, wherein the formation and the inner layer are integrally-formed as part of single unitary body.

29. A concrete mixing truck for transporting concrete from one location to another comprising:
    a mixing drum comprising:
        a wall including an inner surface defining a volume and an outer surface; and
        at least one formation coupled to the wall and extending from the inner surface of the wall, the formation including a body, a support member and at least one helical spring that at least partially extends around a periphery of the support member, the support member and the at least one helical spring being embedded within the end region.

30. The concrete mixing truck of claim 29, wherein the at least one helical spring comprises a plurality of helical springs.

31. The concrete mixing truck of claim 30, wherein the plurality of helical springs are space apart along a length of the support member.

32. The concrete mixing truck of claim 29, wherein the at least one helical spring substantially surrounds the support member.

33. The concrete mixing truck of claim 29, wherein the support member has a circular cross-section.

34. The concrete mixing truck of claim 29, wherein the at least one helical spring extends from the support member to an exterior of the body.

35. The concrete mixing truck of claim 29, wherein the at least one helical spring is configured to retain the support member in a desired position within a mold prior to an injection process.

* * * * *